United States Patent [19]

Phelps, III et al.

[11] Patent Number: 6,136,467
[45] Date of Patent: *Oct. 24, 2000

[54] LATCH SYSTEM FOR BATTERY HOUSING

[75] Inventors: William Phelps, III, Lawrenceville; Mark C. Taraboulos, Chamblee, both of Ga.; Michael Page, Aventura, Fla.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/127,798

[22] Filed: Aug. 2, 1998

[51] Int. Cl.⁷ ...................................................... H01M 2/10
[52] U.S. Cl. .................. 429/97; 429/96; 429/100
[58] Field of Search ................. 429/97, 96, 100, 429/98, 99

[56] References Cited

U.S. PATENT DOCUMENTS

| | | | |
|---|---|---|---|
| 5,314,763 | 5/1994 | Aksoy | 429/97 |
| 5,415,955 | 5/1995 | Kobayashi | 429/97 |
| 5,460,906 | 10/1995 | Leon | 429/97 |
| 5,607,792 | 3/1997 | Garcia et al. | 429/97 |

*Primary Examiner*—Maria Nuzzolillo
*Assistant Examiner*—Mark Ruthkosky
*Attorney, Agent, or Firm*—Philip H. Burrus, IV

[57] ABSTRACT

A latching system for a battery housing for a portable electronic device comprises a housing with an orifice, a button projecting through the orifice in the housing; with a cam on the end of the button in the interior of the housing, and a springy metal sheet attached to the interior of the housing, wherein the springy metal sheet has an orifice. The movement of the button causes the cam on the end of the button to deflect the springy metal sheet, causing an orifice on the springy metal sheet to engage or disengage a projection on the electronic device to which the battery housing is attached.

5 Claims, 5 Drawing Sheets

LATCH SYSTEM FOR BATTERY HOUSING

TECHNICAL FIELD

This invention relates in general to battery housings, more particularly relates to latching systems for battery housings.

BACKGROUND OF THE INVENTION

Nearly forty million Americans now use a cellular telephone, and another nearly seven million or so are expected to subscribe this year. Cellular telephones boutiques and kiosks are becoming a feature in the American business landscape. Cellular telephone sales have risen faster than those of facsimile machines, subscription to cable television, and sales of video cassette recorders. As cellular telephone use, and the use of two-way radios, has become ubiquitous, consumers have come to expect—and demand— more from their communication products. A critical feature, perhaps the most critical feature, in the operation of a personal communications device is the operation of the battery. A battery should have the same degree of ruggedness and durability as the communications device it powers, and have a mechanical attachment to the device secure enough for ordinary and extraordinary conditions of use. The mechanical attachment of the battery to the device should also be easy to operate, yet not be triggered inadvertently.

Therefore, there is a need for an improved latching system to connect a battery to a portable electronic communications device.

DETAILED DESCRIPTION OF THE EMBODIMENT

Figure 1:
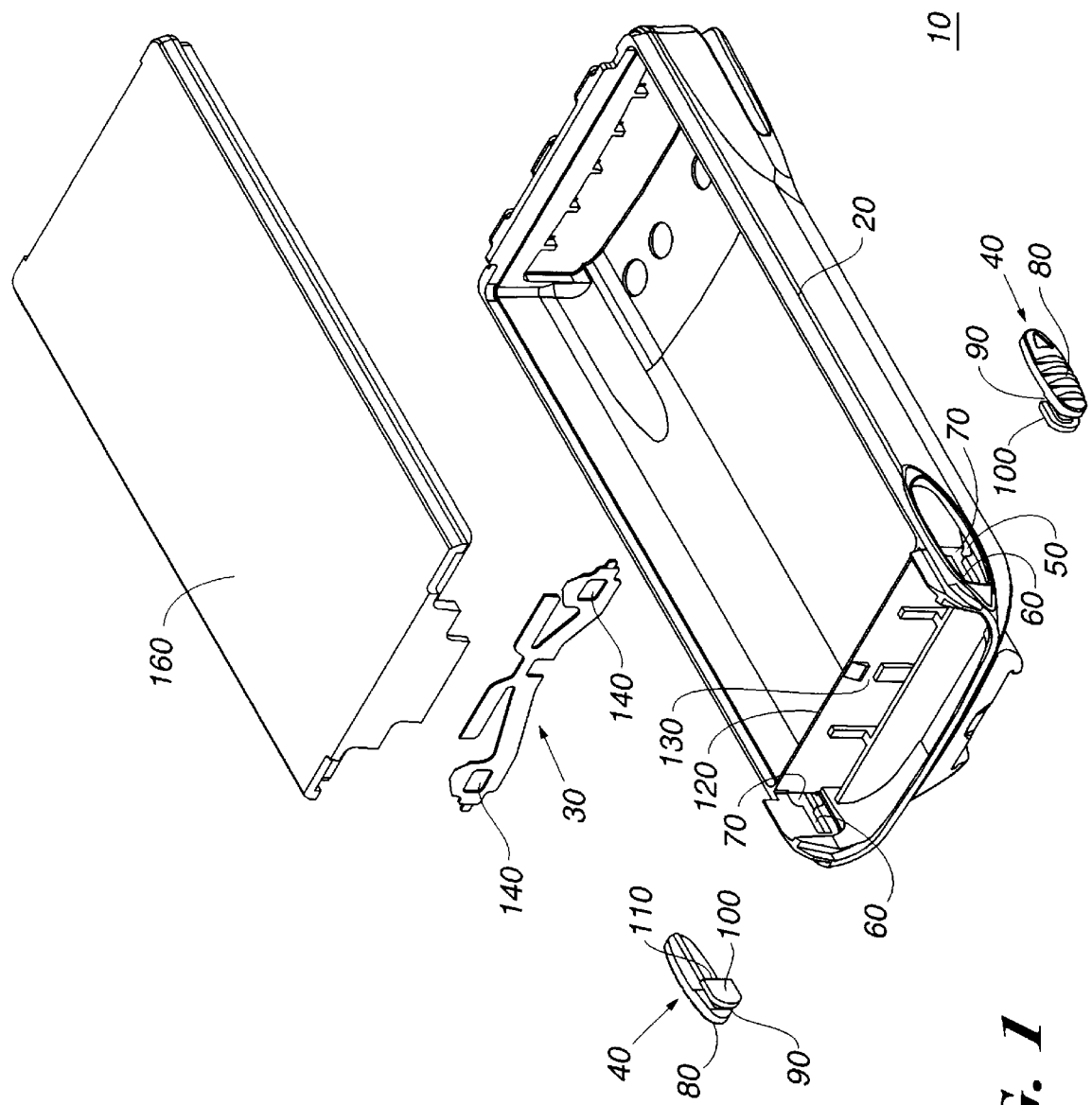
FIG. 1 is an exploded view of the battery housing latch of the present invention.

The present invention is a latching system for a connecting a battery housing to a portable electronic device. The latching system comprising a battery housing, a button extending from the exterior to the interior of the battery housing, and a springy metal sheet attached to the interior of the housing housing. The button has a cam on its interior end which contacts the springy metal, so that the springy metal deflects when the button is moved. The button is located in an orifice in the housing, which maybe either a hole or a channel. When the springy metal sheet is deflected, the orifice in the springy metal sheet releases or catches on a projection on the electronic device. In one embodiment of the present invention, the button consists of a head, a neck, and shoulders, and the orifice comprises a narrow channel to accept the neck and a larger opening at one end of the channel which accepts the shoulders when forced through the larger opening. When the button is slid along the channel, the cam on the end of the button deflects the springy metal sheet, causing the springy metal sheet to release or engage the projection on the electronic device. In one embodiment of the present invention, the channel runs parallel to the direction of the deflection of the metal sheet which provides for engagement and disengagement from a projection on the electronic device. In another embodiment of the invention, the channel runs perpendicular to the direction of the deflection of the metal sheet which provides for engagement and disengagement from a projection from the electronic device.

The present invention provides for a robust durable latching system for a battery housing for a portable electronic device. Since the element that engages the projection from the portable electronic device is metal, the latching system is quite durable. Since engagement element is springy metal, and in one embodiment, springy steel, its springiness will outlast the battery itself. This is in distinct contrast to plastic springy components which have a much shorter useful life, and are subject to cracking and wear. Furthermore, since the engagement element is springy metal, the engagement length can be much longer than if the engagement element were plastic. This permits a longer projection from the electronic device to be engaged, creating a stronger mechanical attachment. Since the springy metal is a separate piece from the button in the housing, the present invention is easily manufactured. Furthermore, the present latching system is made more durable since the plastic and metal are separate components: the manufacturing process need not address the difficult question of reliably mating plastic and steel. Finally, in the sliding embodiment of the invention, the button is easily forced into the channel and remains there due to the fact that the shoulders are slightly larger than the opening that admitted them, and pressure from the springy steel keeps the shoulders, for the most part, somewhat away from the opening that originally admitted them.

FIG. 1 shows an exploded view of the latch system of the present invention. It shows a housing (20), springy metal (30) and button (40). Also shown is cover (160) which is an optional portion of the present invention. The embodiment shown on FIG. 1 is the embodiment where button (40) slides along channel (60), here along the "y" axis. Button (40) consists of the head (80) of the button, which is present in the exterior of the battery housing (20), neck (90) of the button, and shoulders (100) of the button. The shoulders (100) of the button are pressed into the larger opening (70) at the end of the channel, so that the neck of the button (90) rides into the channel (60). The shoulders (100) of the button are slightly larger than the opening (70) at the end of the channel, so that when the button shoulders (100) are pressed through opening (70), the shoulders remain in the interior of the housing so that the button rides along channel (60).

Figure 2:
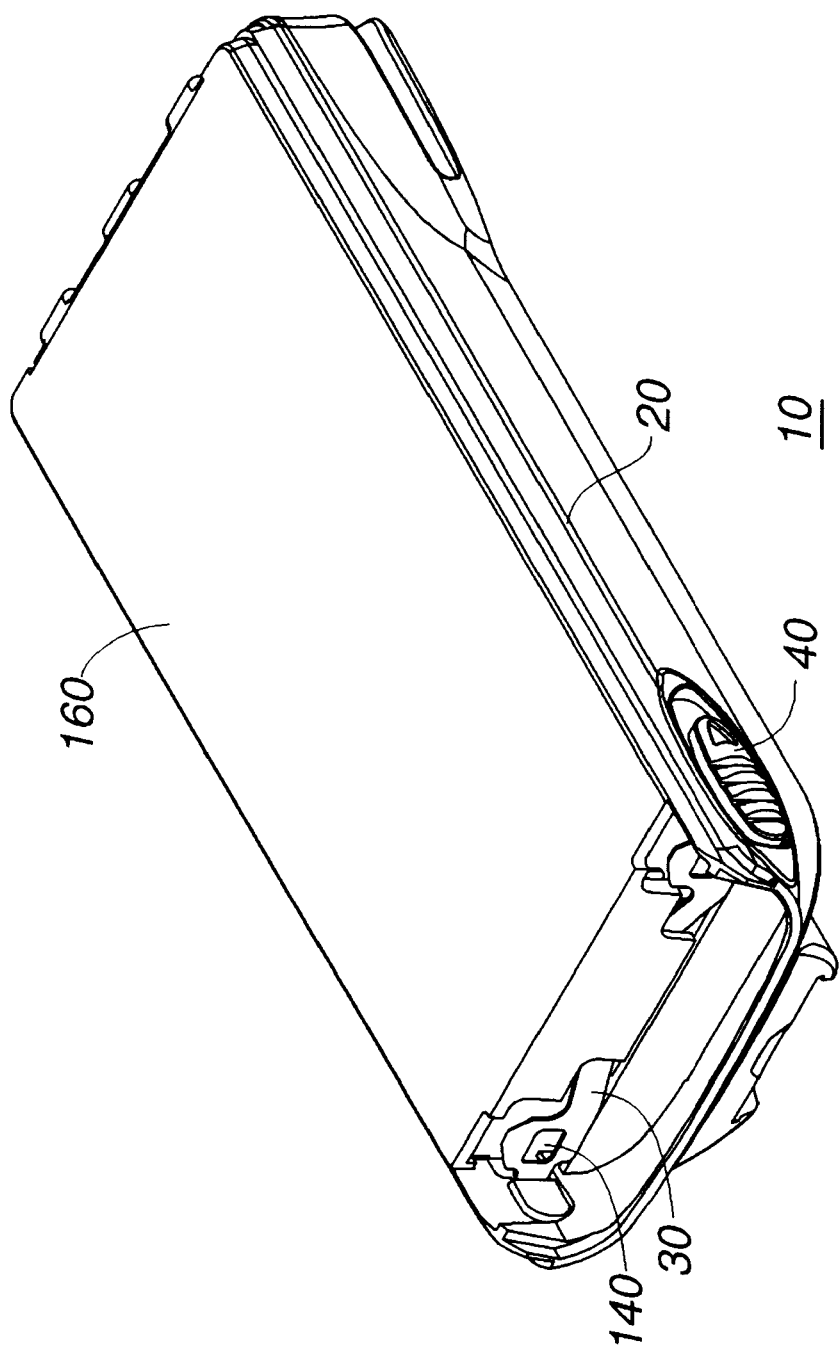
FIG. 2 is a perspective view of the battery housing latch of the present invention.

The complete assembly is shown in FIG. 2. In this embodiment, the cam (110) on the end of the button is simply flat, and the button (40) rides in a channel (60) along the "y" axis, deflecting springy metal (30) back and forth along the "y" axis. This springy metal (30) is attached to crosspiece (120) in the housing, at attachment point (130). As the springy metal (30) is deflected by cam (110), the orifice (140) through the springy metal is similarly deflected back and forth along "y" axis, causing the orifice to either engage or disengage a projection (not shown) on the electronic device to which the battery housing is attached. Cover (160) may be used to secure springy metal (30) to crosspiece (120) on the housing.

Figure 3:
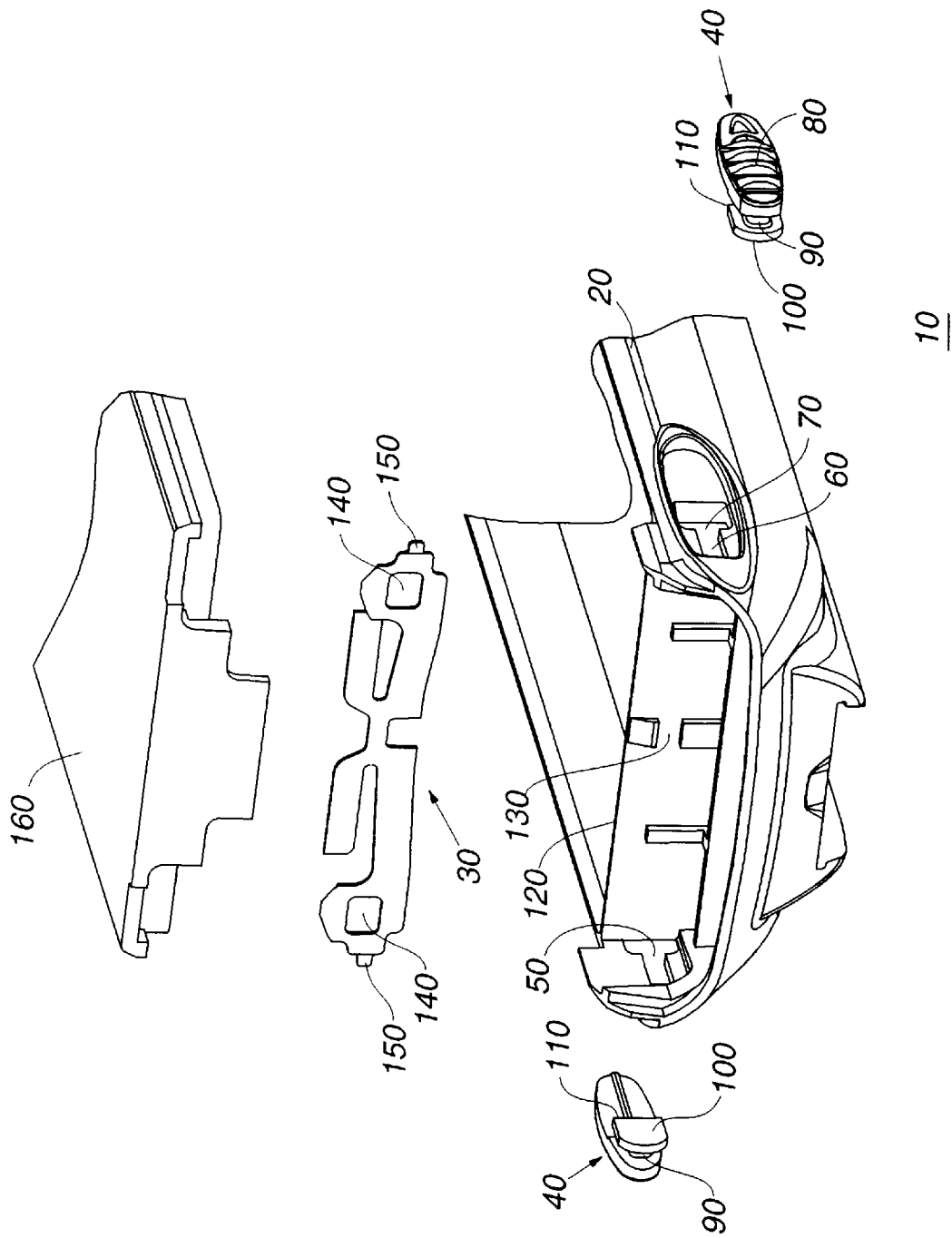
FIG. 3 is an exploded view of the battery housing latch of the present invention.
Figure 4:
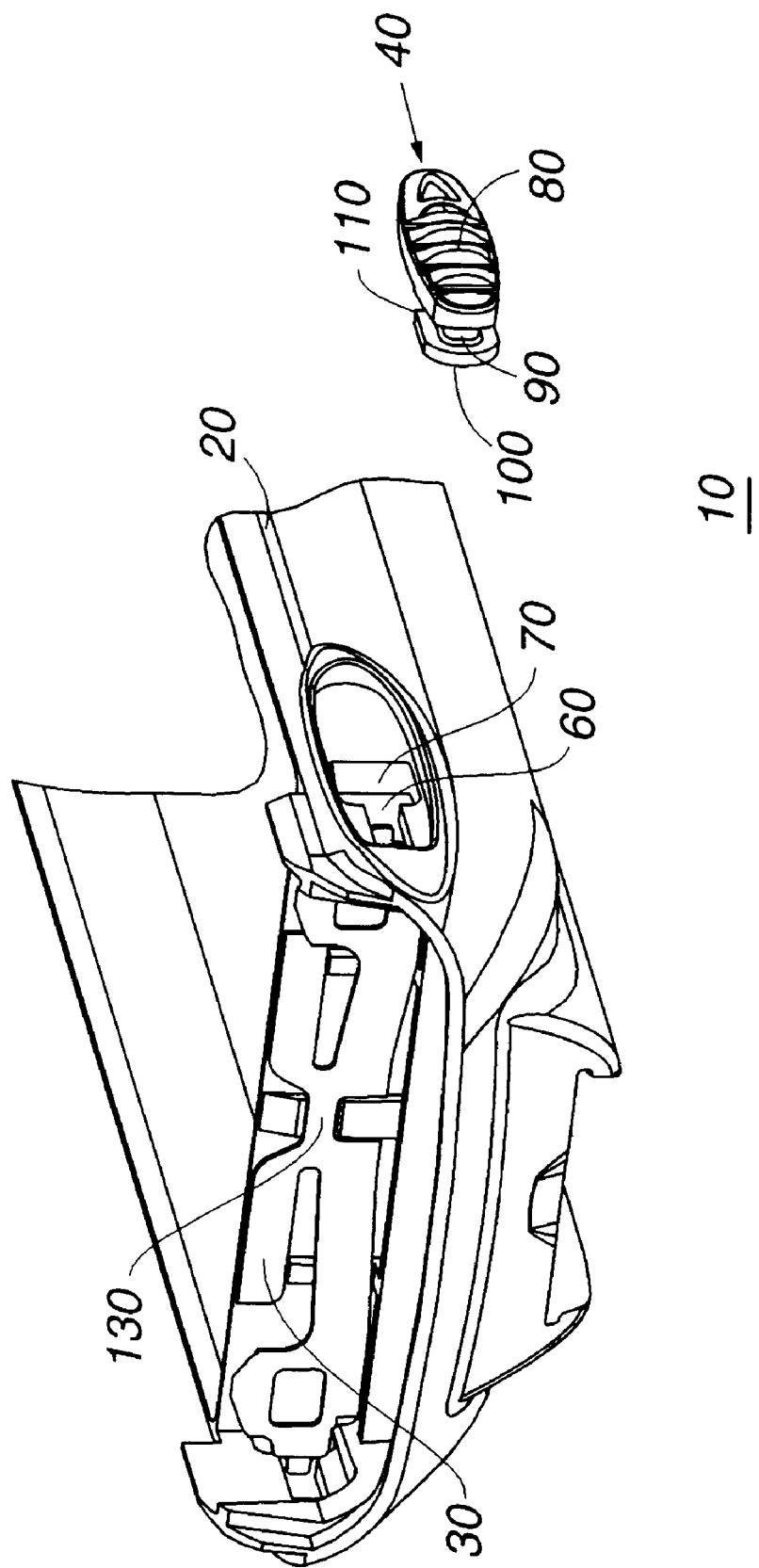
FIG. 4 is an expanded perspective view of the battery housing latch of the present invention.

FIG. 3 shows an exploded view of the battery housing latch (10) of the present invention. FIG. 4 is an expanded perspective view of the battery houwing latch of the present invention.

In a second embodiment of the invention, channel (60) would run parallel to the "z" axis and cam (110) would be angled in the "z, y" plane. For example, the face of cam (110) might lie in a plane which, when it intersects the "z, y" plane, makes line (going through the origin) that forms a 135 degree angle with y axis in the "z, y" plane. This way, when the button (40) was moved along the "z" axis in the channel (60), this would cause springy metal (30) to deflect back and forth along the "y" axis. In such a manner, movement of the button along the "z" axis would be translated by the angle of the cam into motion of the springy metal along the "y" axis. In this embodiment, the end (150) of the springy metal which contacts the cam (110) might also be angled to lie along a diagonal in the "z, y" plane.

Figure 5:
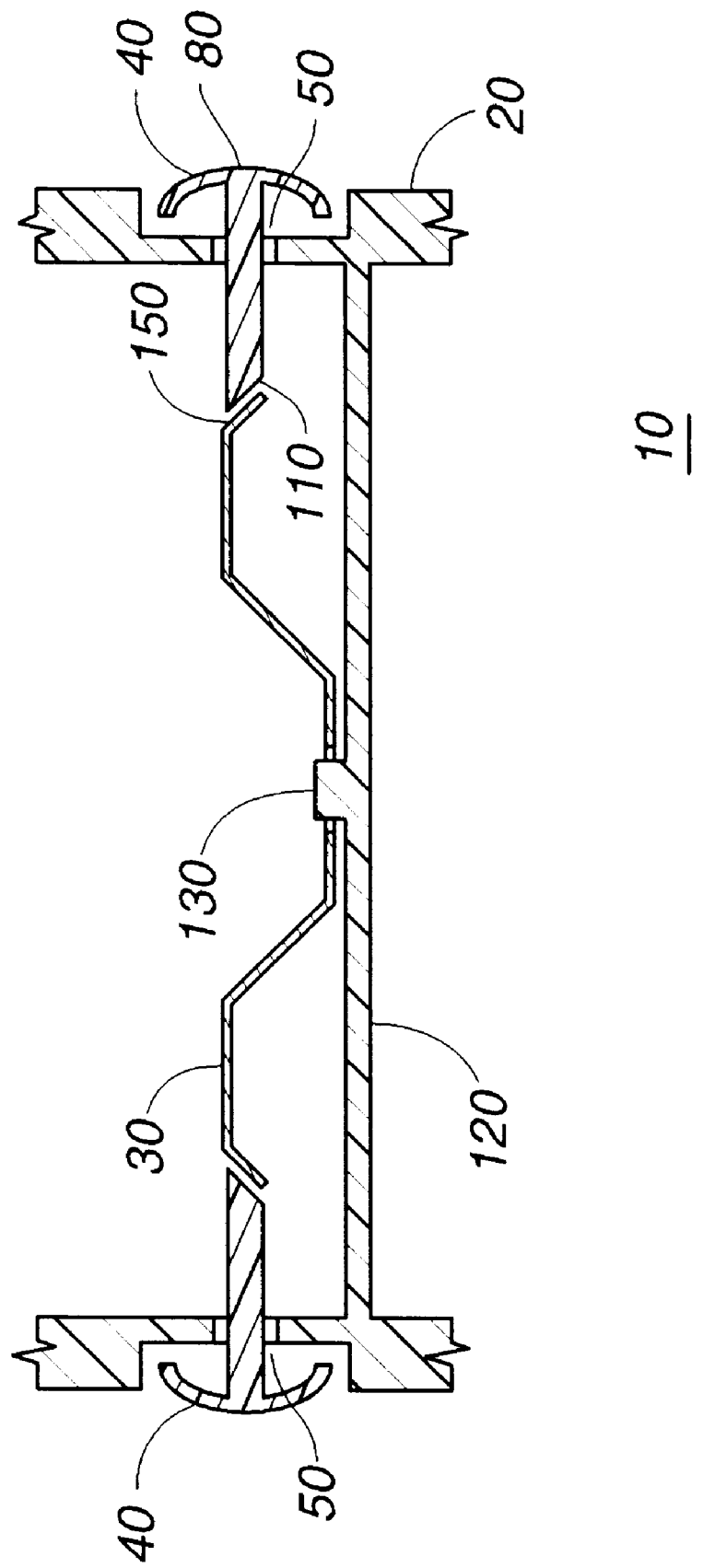
FIG. 5 is a cut-away top view of the third embodiment of the battery housing latch of the present invention.

FIG. 5 shows a third embodiment of the invention. In this embodiment, button (40) moved back and forth along the "x" axis. In otherwords, the button is pushed in and out of the housing (20). In this embodiment, the end (150) of the springy metal lies along a diagonal in the "xy" plane. For example, the diagonal might be a line (going through the origin) at 135 degrees to the x-axis. In this manner, in and out motions of the button (40) along the "x" axis are translated into motions of the springy metal (30) along the "y" axis. This causes the orifice (140) in the springy metal to either engage or disengage a projection (not shown) in the electronic device to which the battery housing (20) is attached. Button (40) could be attached to the housing (20) by means known to those skilled in the art, such as being placed in a well with a lip.

The button and housing of the present invention may be made of any suitable durable material, such as plastic or rubber. The springy metal of the present invention may be made of any suitably elastic metal of sufficient strength, such as steel.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A latching system for a battery housing for a portable electronic device comprising:

(a) a housing with at least two housing orifices;

(b) at least two buttons projecting through the housing orifices, with a cam on the end of each button in the interior of the housing; and (c) a springy metal sheet attached to the interior of the housing, wherein the springy metal sheet has at least one sheet orifice;

where the movement of the buttons cause the cam on the end of the buttons to deflect the springy metal sheet, causing a sheet orifice to engage or disengage a projection on the electronic device to which the battery housing is attached.

2. The latching system of claim 1, wherein at least one of the at least two housing orifices through which at least one of the at least two buttons extend is a hole.

3. The latching system of claim 1, wherein at least one of the at least two housing orifices to which at least one of the at least two buttons extends is a channel.

4. The latching system of claim 3, wherein at least one of the at least two housing orifices consists of a channel and a larger opening.

5. A portable electronic device comprising the latching system of claim 1.

* * * * *